United States Patent [19]

Ohkumo

[11] Patent Number: 4,792,027

[45] Date of Patent: Dec. 20, 1988

[54] CONTROL SYSTEM FOR A CLUTCH FOR A VEHICLE

[75] Inventor: Hiroya Ohkumo, Koganei, Japan

[73] Assignee: Fuji Jukogyo Kabushiki Kaisha, Tokyo, Japan

[21] Appl. No.: 65,028

[22] Filed: Jun. 19, 1987

[30] Foreign Application Priority Data

Jun. 28, 1986 [JP] Japan .................................. 61-152544

[51] Int. Cl.$^4$ ...................... B60K 41/02; F16D 27/16; F16D 37/02

[52] U.S. Cl. ............................. 192/0.032; 192/0.076; 192/21.5

[58] Field of Search ................. 192/0.032, 0.076, 21.5

[56] References Cited

U.S. PATENT DOCUMENTS 4,428,467 1/1984 Hiramatsu ..................... 192/0.076 X
4,623,052 11/1986 Watanabe et al. ................ 192/21.5
4,669,591 6/1987 Sakakiyama ..................... 192/0.076

FOREIGN PATENT DOCUMENTS

0151038 8/1985 European Pat. Off. ......... 192/0.032

Primary Examiner—Rodney H. Bonck
Attorney, Agent, or Firm—Martin A. Farber

[57] ABSTRACT

A system for controlling an electromagnetic clutch for a motor vehicle at starting of the motor vehicle. When the clutch slips and engine speed does not change, a stall signal representing a stall condition is produced. A reference clutch current is provided in accordance with opening degree of a throttle valve of the engine at the stall condition. Clutch current in the stall condition is controlled so as to coincide with the reference clutch current.

3 Claims, 8 Drawing Sheets

CONTROL SYSTEM FOR A CLUTCH FOR A VEHICLE

BACKGROUND OF THE INVENTION

The present invention relates to a control system for an electromagnetic clutch for a motor vehicle.

An automobile provided with a continuously variable belt-drive transmission with an electromagnetic clutch is disclosed in EP-A 151038. The electromagnetic clutch of the transmission is controlled by a control system to provide various operational modes for clutch torque (clutch current). One of the modes is selected in accordance with a position of a selector lever and driving conditions of the vehicle to control the electromagnetic clutch.

Figure 7A:
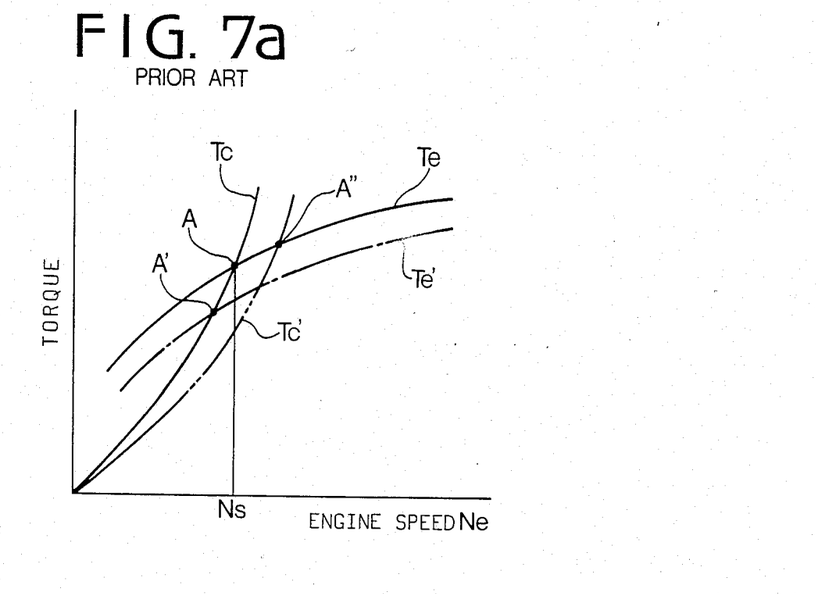
FIGS. 7a and 7b show characteristics of a conventional system.
Figure 7B:
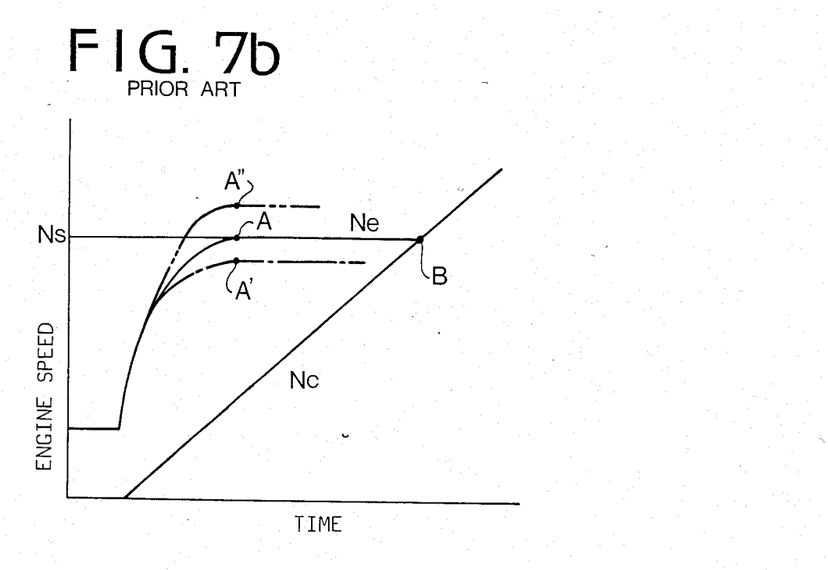

When starting the vehicle, the clutch is controlled by the clutch torque increasing in proportion to the engine speed. Slipping of the clutch when starting of the vehicle depends on the engine torque and the clutch torque. FIG. 7a shows a clutch torque curve Tc and engine torque curve Te at an opening degree of a throttle valve. When the clutch torque coincides with engine torque Te at a point A (stall speed Ns), the clutch begins to engage. At that time, as shown in FIG. 7b, until input speed of the clutch (engine speed Ne) coincides with output speed Nc thereof and the clutch is entirely engaged, at a point B, the engine speed is kept constant. Accordingly, the clutch slips between points A and B, where the clutch engagement rate E (Nc/Ne) is smaller than 1 (E<1), which is the called stall condition.

However, the engine stall speed is influenced by variances in the clutch torque characteristic, which are caused by manufacturing tolerances and deterioration with time, or the reduction of engine torque at high altitudes.

If the engine torque reduces to a line Te' of FIG. 7a, the engine stall speed Ns decreases to a lower point A'. The vehicle starts at a small engine torque range so that the starting characteristic decreases. If the clutch torque reduces to a line Tc', the engine stall speed Ns increases to a point A'', which causes a reduction of transmission efficiency and a rise of temperature of the clutch.

SUMMARY OF THE INVENTION

The object of the present invention is to provide a control system which may improve the engagement operation of clutch at starting of a vehicle to provide an optimum starting characteristic.

According to the present invention, there is provided a system for controlling an electromagnetic clutch for transmitting power of an engine to driving wheels of a motor vehicle comprising, first means for providing a clutch current for the clutch which increases with an increase of speed of the engine, detectors for detecting a slipping state of the clutch when starting the vehicle and for producing a slip signal, second means responsive to the slip signal for producing a stall signal when the changing rate of the engine speed at the start of the vehicle is small, third means responsive to the stall signal for producing a current signal representing a clutch current at that time, fourth means for providing a reference stall current in accordance with load on the engine, a comparator for comparing the clutch current represented by the current signal with the reference stall current and for producing an output signal dependent on the difference between both currents, and fifth means for correcting the current signal in accordance with the output of the comparator so that the clutch current represented by the current signal coincides with the reference stall current.

The other objects and features of this invention will become understood from the following description with

DETAILED DESCRIPTION OF THE PREFERRED EMBODIMENT

Figure 1:
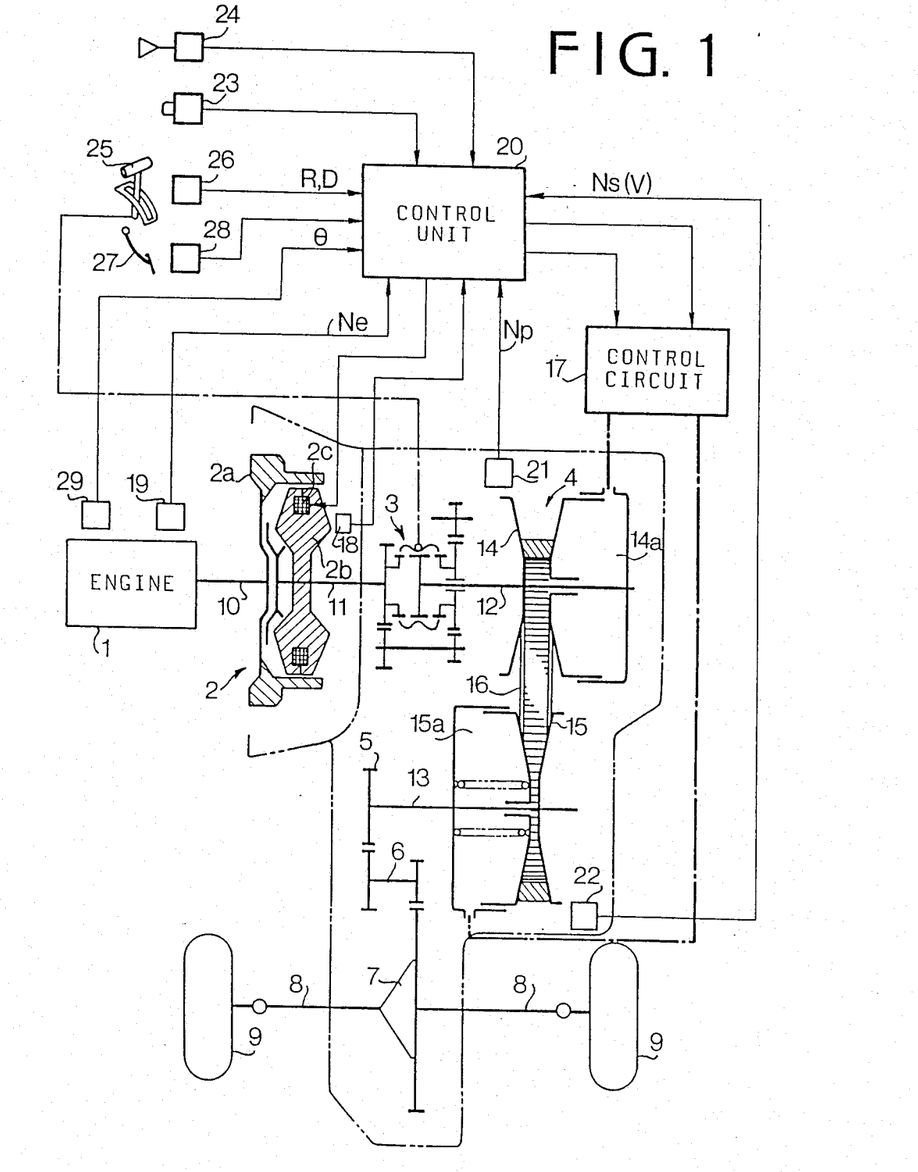
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate 15 reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces of in the cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided. A driven member speed sensor 18 is provided on the clutch 2 at an output shaft of the driven member 2b thereof for sensing the speed of the driven member 2b.

Output signals of the sensors and pulses of the switches are applied to an electronic control unit 20 which produces a clutch current control signal to the clutch 2 and a control signal for controlling the transmission ratio (i) and a line pressure control signal to the control circuit 17.

Figure 2A:
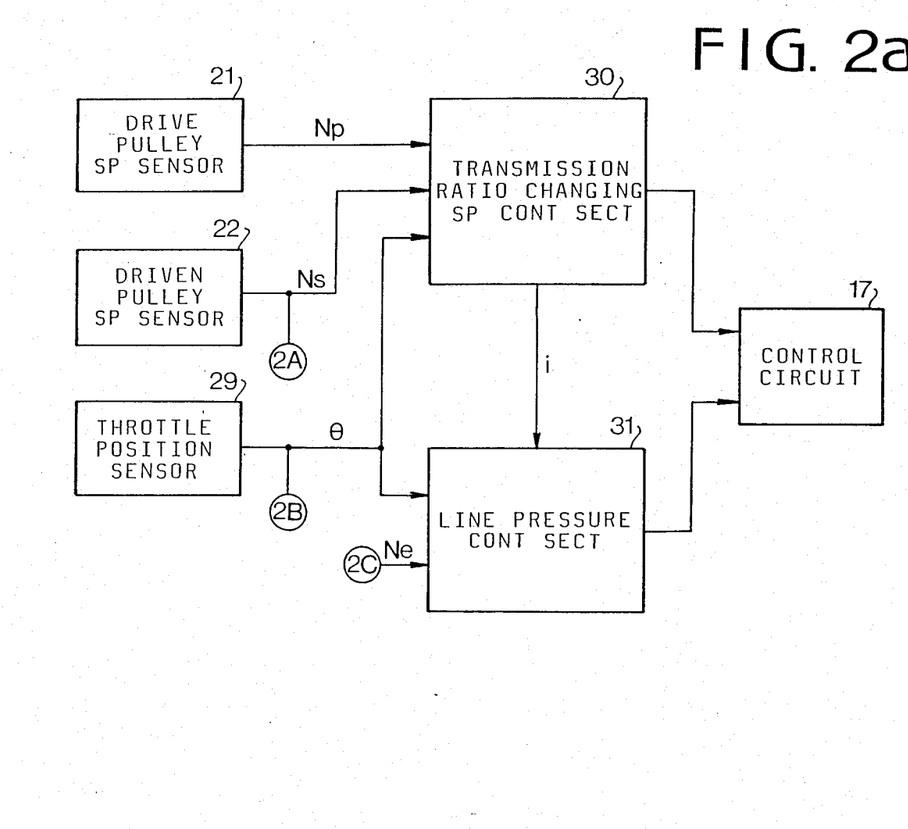
FIGS. 2a and 2b show a block diagram of a control unit according to the present invention.
Figure 2B:
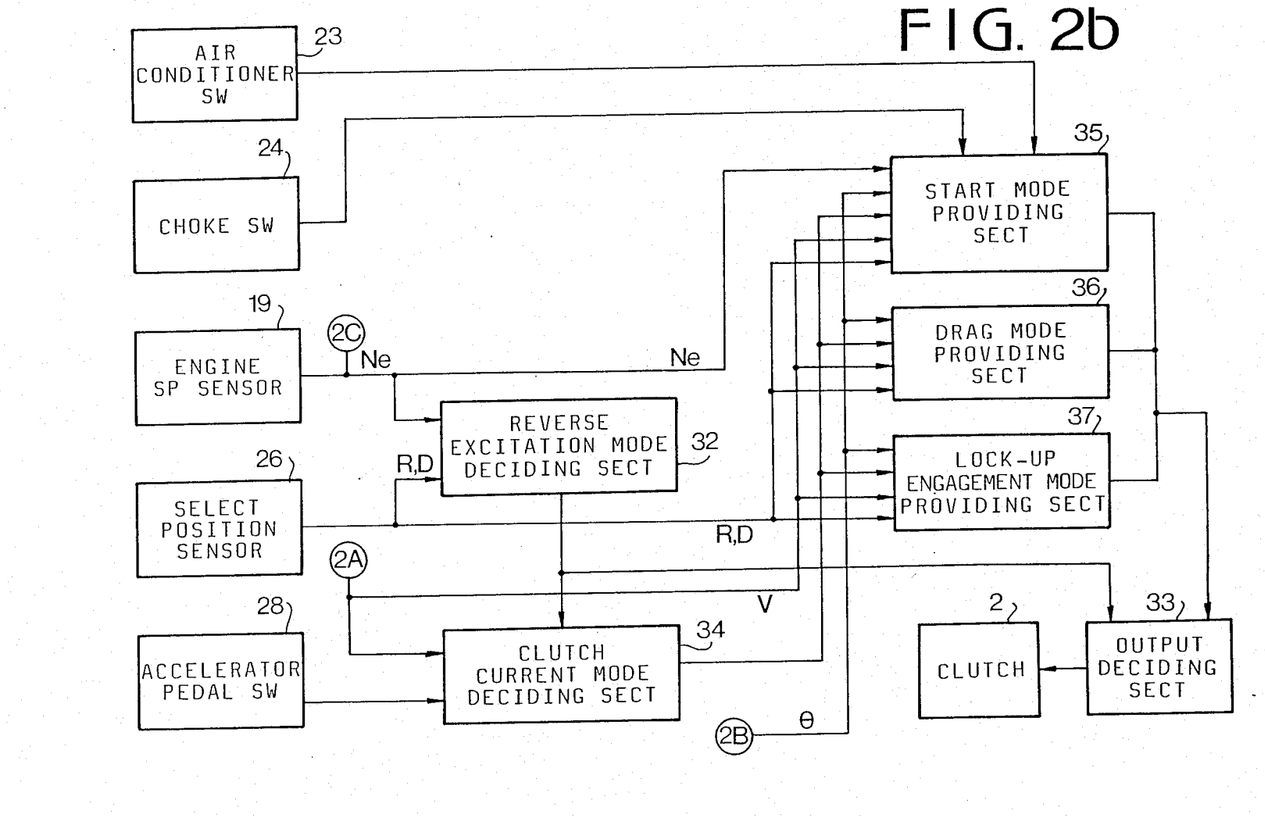

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a desired transmission ratio changing speed (rate) $di/dt$. A line pressure control section 31 is applied with an engine speed signal Ne of the sensor 19, throttle position signal $\theta$ of the sensor 29, and actual transmission ratio signal i ($N_s/N_p$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with the engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engagement mode providing section 37.

The start mode providing section 35 decides clutch current of a starting characteristic dependent on a desired engagement rate of the clutch responsive to the throttle valve opening degree $\theta$ and a driven member speed Nc by the sensor 18. The starting characteristic is corrected by signals from the throttle valve opening degree $\theta$, vehicle speed V, and driving positions of D-range and R-range.

The drag mode providing section 36 decides a small drag current when the accelerator pedal 27 is released at a low speed in each drive position for providing a drag torque to the clutch 2 for the smooth start of the vehicle.

Figure 3:
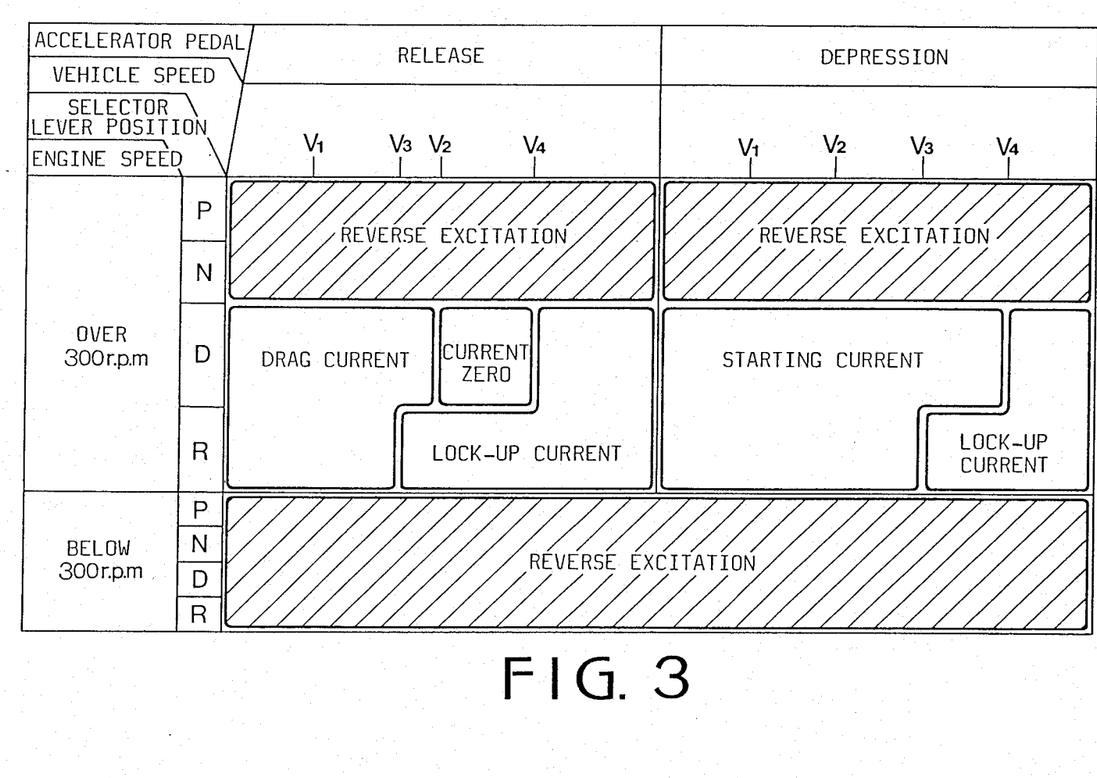
FIG. 3 is a graph showing regions of various modes.

The clutch lock-up engagement mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

Figure 4:
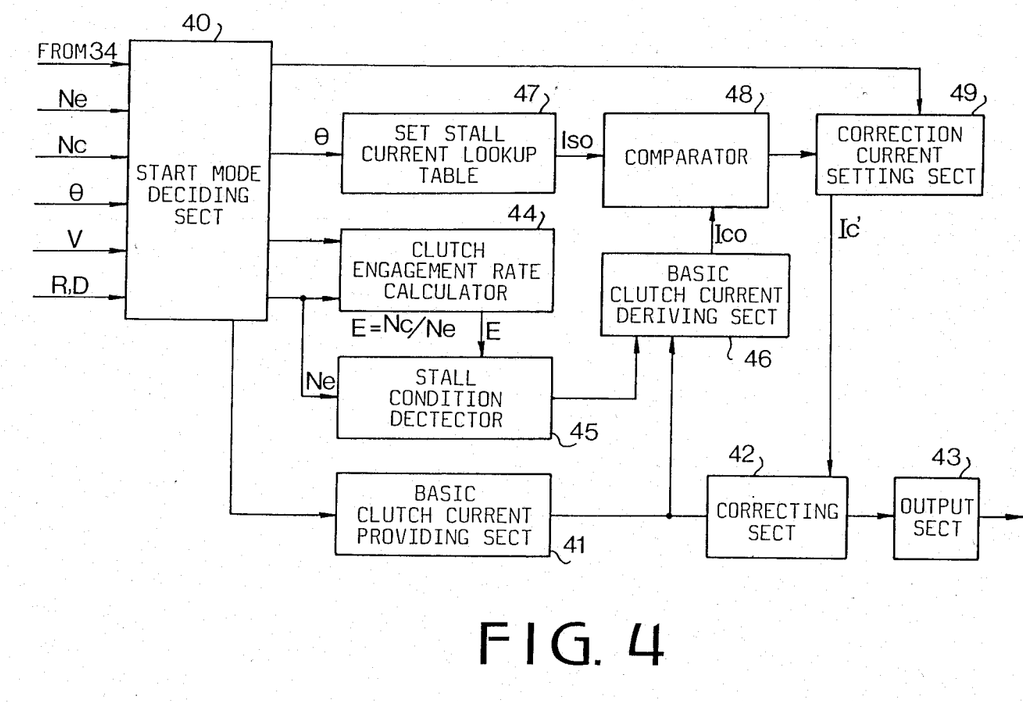
FIG. 4 is a block diagram of a main part of the system according to the present invention.

Referring to FIG. 4, the start mode providing section 35 has a start mode deciding section 40 which is supplied with output signals of the clutch current mode deciding section 34, throttle valve opening degree $\theta$, engine speed Ne, drive positions of R-range and D-range, and driven member speed Nc. A basic clutch current providing section 41 is provided to produce a basic clutch current Ico which is proportional to engine speed Ne (Ico=f(Ne)). The output of the section 41 is applied to an output section 43 through a correcting section 42. Signals of the engine speed Ne and the driven member speed Nc are applied to a clutch engagement rate calculator 44. The calculation of the clutch engagement rate E is made by E=Nc/Ne. The clutch engagement rate E and engine speed Ne are applied to a stall condition detector 45. The stall condition detector 45 produces a stall signal when engine speed changing rate is small ($dNe/dt \approx 0$) at slipping of the clutch (E<1). The stall signal is applied to a basic clutch current deriving section 46 which derives a basic clutch current Ico from the basic clutch current providing section 41 in response to the stall signal.

Further, throttle valve opening degree $\theta$ is applied to a set stall current lookup table 47. The table 47 stores a plurality of reference stall currents (Iso) for desired stall speeds (Nsd) which are set in accordance with the opening degree $\theta$ of the throttle valve.

Signals representing the currents Ico and Iso are applied to a comparator 48 to produce a difference between the currents. The output of the comparator 48 is applied to a correction current setting section 49 which produces a correction current Ic' in accordance with the output of the comparator 48. Further, the output of the start mode deciding section 40 is applied to the correction current setting section 49. The section 49 produces a signal representing Ic'=0 in driving conditions other than the start mode.

Figure 5:
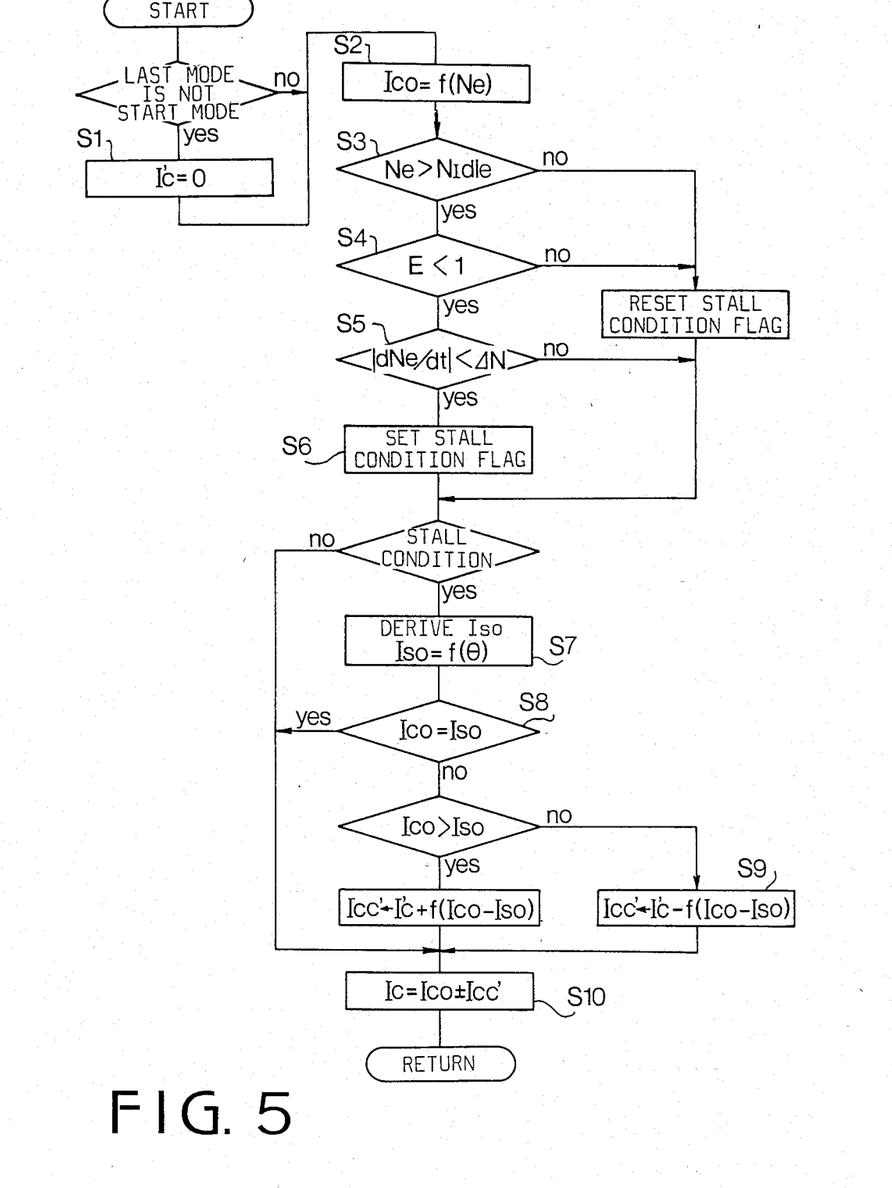
FIG. 5 is a flow chart showing the operation of the system.
Figure 6A:
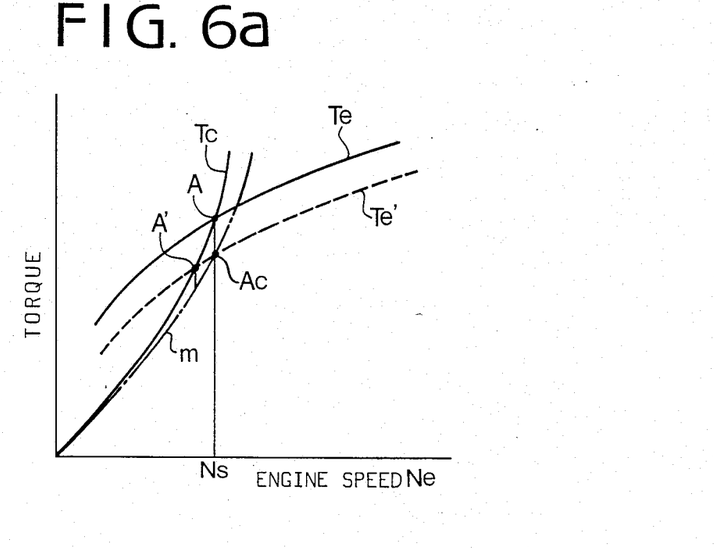
FIGS. 6a and 6b show characteristics of the system of the present invention.
Figure 6B:
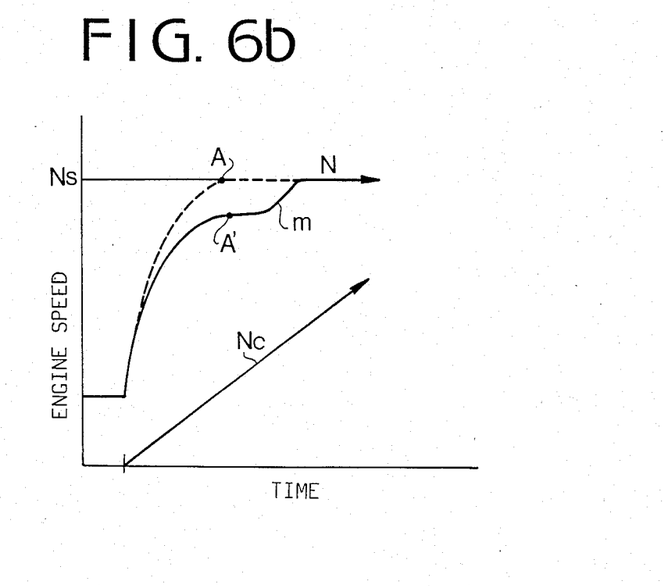

Referring to FIGS. 5, 6a and 6b, the operation of the control system is described hereinafter. At the starting of the vehicle, when the accelerator pedal is depressed while the select lever is positioned at D-range, the start mode providing section 35 is selected, and the basic clutch current Ico is obtained at basic clutch current providing section 41. When the last mode is not the start mode, the correction current Ic' is set to zero (Ic'=0) at the correction current setting section 49 to initialize the system (step S1 of FIG. 5). Accordingly, the basic clutch current Ico flows in the clutch 2 to produce clutch torque Tc (S2). The clutch torque Ic increases gradually with increase of engine speed Ne as shown in FIG. 6a. When engine speed Ne is higher than idle speed Nidle (S3), and the clutch slips (E<1) (S4) and changing rate of engine speed is smaller than a predetermined small value ($dNe/dt < \Delta N$)(S5), condition flag is set at a step S6. Then, a reference stall current Iso is derived from the table 47 in accordance with the opening degree θ of the throttle valve at the stall condition (S7). The clutch current Ico at that time and reference stall current Iso are compared with each other at comparator 48 (S8). When Ico=Iso which means that clutch torque Tc coincides at an intersection point A of FIG. 6a with the engine torque Te at a desired stall speed Nsd, the correction current Ic' at the section 49 becomes zero (Ic'=0). When the engine torque reduces in spite of the same throttle valve opening degree θ to a dotted line Te' of FIG. 6a, the intersection point changes to a point A' at a lower stall speed than the desired stall speed Nsd, which means Ico<Iso, a correction current Ic' is determined in dependence on the difference (Ico−Iso) at the comparator 48. Namely, a function f(Ico−Iso) is subtracted from the correction current Ic' to produce a corrected correction current Icc' (Icc'=Ic'−f(Ico−Iso) (S9) ). The corrected correction current Icc' is subtracted from the clutch current Ico (Ic=Ico−Icc') (S10). Thus, the clutch torque Tc reduces to a small torque and increases at a small torque characteristic as shown by line m in FIG. 6a, an coincides with the engine torque Te' at a point Ac at the desired stall speed Nsd.

To the contrary, when Ico>Iso, a corrected correction current Icc' is added to the clutch current (Ic=Ico+Icc') (S10).

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling an electromagnetic clutch for transmitting power of an engine to driving wheels of a motor vehicle comprising:

first means for providing a clutch current for the clutch which increases with increase of speed of the engine;

detectors for detecting a slipping state of the clutch at start of the vehicle and for producing a slip signal;

second means responsive to the slip signal for producing a stall signal when changing rate of the engine speed at the start of the vehicle is small;

third means responsive to the stall signal for producing a current signal representing a clutch current at that time;

fourth means for providing a reference stall current in accordance with load on the engine;

a comparator for comparing the clutch current represented by the current signal with the reference stall current and for producing an output signal dependent on the difference between both currents; and fifth means for correcting the current signal in accordance with the output of the comparator so that the clutch current represented by the current signal coincides with the reference stall current.

2. The system according to claim 1 wherein the load on the engine is represented by opening degree of a throttle valve of the engine.

3. The system according to claim 1 wherein the reference stall current is derived from a lookup table storing a plurality of reference stall currents.

* * * * *